US008836799B2

(12) United States Patent
Kim et al.

(10) Patent No.: US 8,836,799 B2
(45) Date of Patent: Sep. 16, 2014

(54) METHOD TO REJECT FALSE POSITIVES DETECTING AND TRACKING IMAGE OBJECTS

(75) Inventors: Taesu Kim, Seoul (KR); Hyun-Mook Cho, Seoul (KR); Hyung-Il Koo, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 13/550,531

(22) Filed: Jul. 16, 2012

(65) Prior Publication Data
US 2013/0258141 A1   Oct. 3, 2013

Related U.S. Application Data

(60) Provisional application No. 61/618,388, filed on Mar. 30, 2012.

(51) Int. Cl.
*H04N 5/228* (2006.01)

(52) U.S. Cl.
USPC .................................. 348/208.14; 348/226.1

(58) Field of Classification Search
USPC ............................... 348/208.14, 222.1, 226.1
See application file for complete search history.

(56) References Cited

U.S. PATENT DOCUMENTS

| | | | |
|---|---|---|---|
| 7,366,325 B2 | 4/2008 | Fujimura et al. | |
| 7,460,689 B1 * | 12/2008 | Chan ............................. | 382/103 |
| 7,489,806 B2 | 2/2009 | Mohri et al. | |
| 7,747,151 B2 | 6/2010 | Kochi et al. | |
| 7,796,872 B2 | 9/2010 | Sachs et al. | |
| 8,073,196 B2 | 12/2011 | Yuan et al. | |
| 2009/0051782 A1 * | 2/2009 | Ono et al. ................... | 348/226.1 |
| 2011/0058055 A1 * | 3/2011 | Lindahl et al. ............. | 348/222.1 |
| 2012/0051596 A1 * | 3/2012 | Darnell et al. ................ | 382/103 |
| 2012/0093362 A1 * | 4/2012 | Liu et al. ....................... | 382/103 |

FOREIGN PATENT DOCUMENTS

WO   2008143523 A1   11/2008

OTHER PUBLICATIONS

International Search Report and Written Opinion—PCT/US2013/029698—ISA/EPO—Jun. 26, 2013.
Yokokohji, Y., et al., "Accurate image overlay on video see-through HMDs using vision and accelerometers", Virtual Reality, 2000. Proceedings. IEEE New Brunswick, NJ, USA, Mar. 18, 2000, pp. 247-254, XP010378990, DOI: 10.1109/VR.2000.840505, ISBN: 978-0-7695-04 78-0.
You, S. et. al., "Fusion of Vision and Gyro Tracking for Robust Augmented Reality Registration", Virtual Reality, 2001, Proceedings. IEEE Publication pp. 71-78, Mar. 17, 2001.
You. S., et al., "Hybrid inertial and vision tracking for augmented reality registration," In Proc. VR 1999, pp. 260-267, Houston, Texas, USA, Mar. 13-17, 1999.

* cited by examiner

*Primary Examiner* — Gevell Selby
(74) *Attorney, Agent, or Firm* — Kilpatrick Townsend & Stockton LLP

(57) ABSTRACT

Methods, apparatuses, systems, and computer-readable media for rejecting false positive detection and tracking of image objects are presented. According to one or more aspects, a computing device may implement embodiments of the invention to use the movement of the mobile device for distinguishing false positives from true movement of the mobile device depicted in the field of view of the camera. In one embodiment, the actual movement of the mobile device may be measured using multi-modal sensor data from inertial sensors such as accelerometers and gyroscopes. In another embodiment, the actual movement of the device is calculated using the global movement of the mobile phone with reference to other objects in the field of view of the camera.

22 Claims, 9 Drawing Sheets

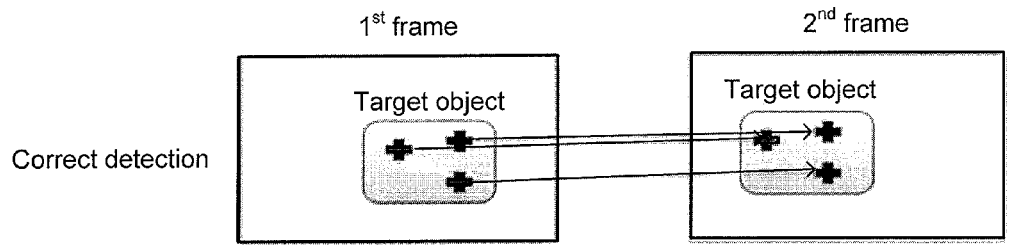
FIG. 2A
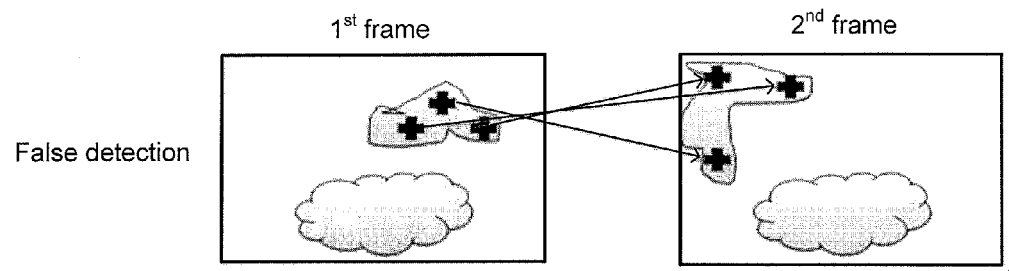
FIG. 2B
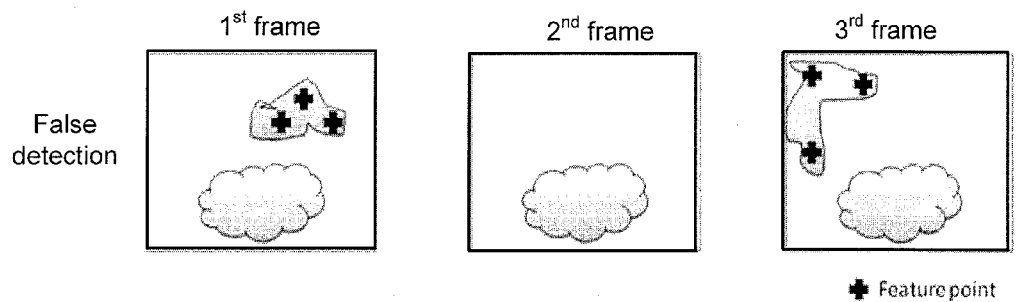
FIG. 2C
FIG. 2

METHOD TO REJECT FALSE POSITIVES DETECTING AND TRACKING IMAGE OBJECTS

CROSS-REFERENCE TO RELATED APPLICATIONS

This patent application claims the benefit of U.S. Provisional Patent Application Ser. No. 61/618,388 filed Mar. 30, 2012, and entitled "Method to Reject False Positives Detecting and Tracking Image Objects," which is incorporated by reference herein in its entirety for all purposes.

BACKGROUND

Aspects of the disclosure relate to computing technologies. In particular, aspects of the disclosure relate to mobile computing device technologies, such as systems, methods, apparatuses, and computer-readable media for rejecting false positive detection and tracking of image objects.

Computer vision allows a device to perceive the environment in the device's vicinity. Computer vision in mobile devices enables applications in augmented reality by allowing the display device augment the reality of a user's surroundings. Current vision based augmented reality engines provide solutions for registering objects, finding feature points, and detecting and tracking objects. In an example application, a picture frame in the view of the camera may be registered by the mobile device and the augmented reality application may overlay a different image or video in the picture frame. So, the interior of the picture frame may have a different or no image, as opposed to when viewed through the display screen of the mobile device. Current overlay engines sometimes generate false positives when the camera input has similar features to a registered object leading to undesirable flickering of the image.

Embodiments of the invention address this undesirable flickering of the image and other problems.

SUMMARY

Systems, methods, apparatuses, and computer-readable media for rejecting false positive detection and tracking of image objects are presented. As noted above, while current overlay engines generally work well, they sometimes generate false positives when the camera input has similar features to a registered object leading to undesirable flickering of the image.

By implementing aspects of the disclosure, however, a device may detect and reject these false positive detection and tracking of image objects. Embodiments of the invention use actual movement of the mobile device for distinguishing false positives from true movement of the mobile device depicted in the field of view of the camera. In one embodiment, the actual movement of the mobile device may be measured using multi-modal sensor data from inertial sensors such as accelerometers and gyroscopes. In another embodiment, the actual movement of the device is calculated using the global movement of the mobile phone with reference to other objects in the field of view of the camera. Generally, when the device doesn't move, feature points should not move and when the device moves, the feature points should move in the opposite direction on the display screen of the mobile device. Embodiments of the invention compare the movement of the mobile device with the shift of the features in the field of view in determining if the motion detected with reference to the feature in the field of view of the camera should be rejected or not.

An example method for rejecting information using a mobile device may include obtaining a video frame using a camera coupled to the mobile device, detecting an at least one portion of the video frame at least partially representing a feature, identifying a first shift associated with the at least one portion of the video frame, identifying a second shift associated with an entire video frame, determining a disparity between the first shift and the second shift, determining flickering in a detection of the feature by determining that the disparity is higher than a predetermined threshold, and rejecting the at least one portion of the video frame at least partially representing the feature as a false positive detection due to flickering. If the disparity is lower than the predetermined threshold, the method may overlay a video according to the first shift for displaying the video on a display unit.

In one embodiment, the second shift associated with the entire video frame is identified using motion detected from an inertial sensor coupled to the mobile device. The inertial sensor may be one or more from a group comprising of a gyroscope and an accelerometer. In another embodiment, the second shift associated with the entire video frame is identified using motion calculated from portions of the video frame that are distinct from the at least one portion of the video frame.

An example method for tracking at least one portion of a video includes obtaining a video frame using a camera coupled to a mobile device, identifying a shift associated with the video frame, determining an at least one possible location for the at least one portion of the video frame representing a feature based on the shift associated with the video frame; and tracking the at least one portion of the video frame at the at least one possible location. The example method may further comprise rejecting the at least one portion of the video frame partially representing the feature as a false positive detection of the feature if the at least one portion of the video frame is detected outside the at least one possible location for the at least one portion of the video frame. In some instances, the video is overlaid according to the identified shift.

In one embodiment, the shift associated with the entire video frame is identified using motion detected from an inertial sensor coupled to the mobile device. The inertial sensor may be one or more from a group comprising of a gyroscope and an accelerometer. In another embodiment, the shift associated with the entire video frame is identified using motion calculated from portions of the video frame that are distinct from the at least one portion of the video frame.

An example device implementing the system may include a processor, a camera coupled to the processor, a display unit coupled to the processor and a non-transitory computer readable storage medium coupled to the processor, wherein the non-transitory computer readable storage medium comprises code executable by the processor comprising obtaining a video frame using the camera coupled to the device, detecting an at least one portion of the video frame at least partially representing a feature, identifying a first shift associated with the at least one portion of the video frame, identifying a second shift associated with an entire video frame, determining a disparity between the first shift and the second shift, determining flickering in a detection of the feature by determining that the disparity is higher than a predetermined threshold; and rejecting the at least one portion of the video frame at least partially representing the feature as a false positive detection due to flickering. The device may further comprise overlaying a video according to the first shift for displaying on the display unit if the disparity is lower than the predetermined threshold.

In one aspect of the exemplary device, the second shift associated with the entire video frame may be identified by components of the device using motion detected from an inertial sensor coupled to the mobile device. The inertial sensor may be one or more from a group comprising of a gyroscope and an accelerometer. In another embodiment of the device, the second shift associated with the entire video frame may be identified using motion calculated from portions of the video frame that are distinct from the at least one portion of the video frame.

Another example device implementing a system for tracking may include a processor, a camera coupled to the processor, a display unit coupled to the processor; and, a non-transitory computer readable storage medium coupled to the processor, wherein the non-transitory computer readable storage medium comprises code executable by the processor comprising obtaining a video frame using the camera coupled to the device, identifying a shift associated with the video frame; determining an at least one possible location for an at least one portion of the video frame representing a feature based on the shift associated with the video frame; and tracking the at least one portion of the video frame at the at least one possible location. The device further comprises rejecting the at least one portion of the video frame partially representing the feature as a false positive detection of the feature if the at least one portion of the video frame is detected outside the at least one possible location for the at least one portion of the video frame. Furthermore, device may overlay the video according to the shift.

In one embodiment of the exemplary device, the shift associated with the entire video frame may be identified by components of the device using motion detected from an inertial sensor coupled to the mobile device. The inertial sensor may be one or more from a group comprising of a gyroscope and an accelerometer. In another embodiment of the device, the shift associated with the entire video frame may be identified using motion calculated from portions of the video frame that are distinct from the at least one portion of the video frame.

An example non-transitory computer readable storage medium coupled to a processor, wherein the non-transitory computer readable storage medium comprises a computer program executable by the processor comprising obtaining a video frame using a camera coupled to a mobile device, detecting an at least one portion of the video frame at least partially representing a feature, identifying a first shift associated with the at least one portion of the video frame, identifying a second shift associated with an entire video frame, determining a disparity between the first shift and the second shift, determining flickering in a detection of the feature by determining that the disparity is higher than a predetermined threshold; and rejecting the at least one portion of the video frame at least partially representing the feature as a false positive detection due to flickering.

In another example non-transitory computer readable storage medium coupled to a processor, wherein the non-transitory computer readable storage medium comprises a computer program executable by the processor includes obtaining a video frame using a camera coupled to a mobile device, identifying a shift associated with the video frame, determining an at least one possible location for an at least one portion of the video frame representing a feature based on the shift associated with the video frame, and tracking the at least one portion of the video frame at the at least one possible location.

An example apparatus for rejecting information comprises means for obtaining a video frame using a camera coupled to a mobile device, means for detecting an at least one portion of the video frame at least partially representing a feature, means for identifying a first shift associated with the at least one portion of the video frame, means for identifying a second shift associated with an entire video frame, means for determining a disparity between the first shift and the second shift, means for determining flickering in a detection of the feature by determining that the disparity is higher than a predetermined threshold; and means for rejecting the at least one portion of the video frame at least partially representing the feature as a false positive detection due to flickering.

Another or same apparatus for tracking includes means for obtaining a video frame using a camera coupled to a mobile device, means for identifying a shift associated with the video frame, means for determining an at least one possible location for an at least one portion of the video frame representing a feature based on the shift associated with the video frame; and means for tracking the at least one portion of the video frame at the at least one possible location.

The foregoing has outlined rather broadly the features and technical advantages of examples according to disclosure in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIGS. 2A, 2B and 2C illustrate the flickering of the features due to the false positive detection of features for an unstable mobile device that has movement associated with it.

DETAILED DESCRIPTION

Computer vision allows a device to perceive the environment in the device's vicinity. In one embodiment, computer vision in devices enables applications in augmented reality by allowing the display unit to augment the reality of a user's surroundings. Current vision based augmented reality engines provide solutions for registering objects, finding features, and detecting and tracking objects. In an example application, a picture frame in the view of the camera may be registered by the mobile device and the augmented reality application may overlay a different image or video in the picture frame. So, the interior of the picture frame may have a different or no image, as opposed to when viewed through the display unit of the mobile device. However, current overlay engines sometimes generate false positives when the camera input has similar features to a registered object leading to flickering of the image. Flickering of the image may be caused due to a number of scenarios including deficiencies in the feature detection algorithms in differentiating between the identified features and the changes in the perceived image due to the motion of the device.

Embodiments of the invention use actual movement of the mobile device for distinguishing false positives from true movement of the mobile device depicted in the field of view of the camera. In one embodiment, the actual movement of the mobile device may be measured using multi-modal sensor data from inertial sensors such as accelerometers and gyroscopes. In another embodiment, the actual movement of the device is calculated using the global movement of the mobile phone with reference to other objects in the field of view of the camera. Generally, when the device doesn't move, feature points should not move and when the device moves, the feature points should move in the opposite direction on the display unit of the mobile device. Embodiments of the invention compare the movement of the mobile device with the shift of the features in the field of view in determining if the motion detected with reference to the feature in the field of view of the camera should be rejected or not. As described herein, features and feature points may be used interchangeably to describe portions of an image or a video sequence. In one embodiment, a feature may comprise of multiple feature points.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
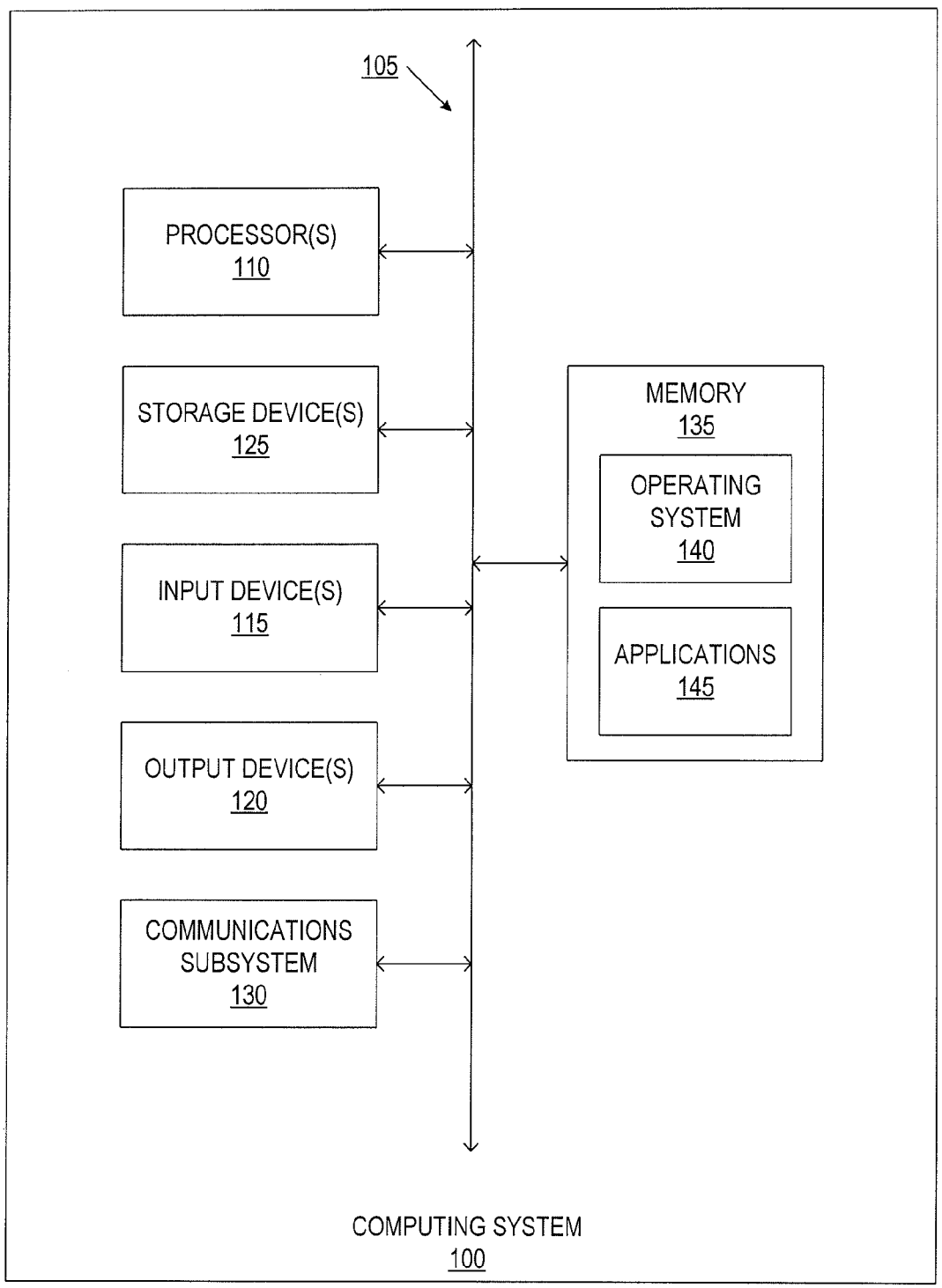
FIG. 1 illustrates an exemplary computer system incorporating parts of the device employed in practicing embodiments of the invention.

FIG. 1 illustrates an exemplary computer system incorporating parts of the device employed in practicing embodiments of the invention. A computer system as illustrated in FIG. 1 may be incorporated as part of the mobile device discussed herein. For example, computer system 100 can represent some of the components of a mobile device. A mobile device may be any computing device with an input sensory unit like a camera and a display unit. Examples of a mobile device include, but are not limited to, video game consoles, tablets, smart phones and any other hand-held devices. FIG. 1 provides a schematic illustration of one embodiment of a computer system 100 that can perform the methods provided by various other embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation a camera, sensors (including inertial sensors), a mouse, a keyboard and/or the like; and one or more output devices 120, which can include without limitation a display unit. Block 308 and 310 from FIG. 3, 418 from FIG. 4, 518 from FIG. 5, 606 from FIG. 6, 706 from FIG. 7 may use an output device 120 such as a display unit for overlaying the video.

The computer system 100 may further include (and/or be in communication with) one or more non-transitory storage devices 125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. For example, the computer programs described in the figures may use one or more non-transitory storage devices as discussed above.

The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), other computer systems, and/or any other devices described herein. In many embodiments, the computer system 100 will further comprise a non-transitory working memory 135, which can include a RAM or ROM device, as described above. The image processing and overlay functions from the figures may occur in working memory 135 of the computer system.

The computer system 100 also can comprise software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium might be incorporated within a computer system, such as computer system 100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 100) to perform methods in accordance with the disclosure. For example, some or all of the procedures of the described methods may be performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 125. Volatile media include, without limitation, dynamic memory, such as the working memory 135. Transmission media include, without limitation, coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc. carried by the signals) to the working memory 135, from which the processor(s) 110 retrieves and executes the instructions. The instructions received by the working memory 135 may optionally be stored on a non-transitory storage device 125 either before or after execution by the processor(s) 110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Current vision based augmented reality engines provide solutions for registering objects, finding feature points, and detecting and tracking objects. Augmented Reality engines also provide tools to manipulate and augment those detected features and objects. Features may be defined as a set of feature points. In an example application, a picture frame hanging on the wall in the view of the camera may be registered by the mobile device and the augmented reality application may overlay a different image or video in the picture frame. So, the interior of the picture frame on the wall may have a different or no image, as opposed to when viewed through the display screen of the mobile device.

Current overlay engines generally work well, however sometimes they generate false positives when the mobile device is moving and camera input has similar features to a registered feature/object leading to undesirable flickering of the image. In the above example, for a picture frame hanging from a wall, wherein the wall has a boxed designs, movement of the mobile device may cause the augmented reality engine on the mobile device to momentarily lock onto the boxed design in the background instead of the picture frame leading to flickering of the overlaid video in the display unit of the mobile device.

FIGS. 2A, 2B and 2C illustrate the flickering of the features due to the false positive detection of features for an unstable mobile device that has movement associated with it. The plus signs in the figures represent the feature points associated with the features. FIG. 2A illustrates correctly detected feature points across multiple frames. A target object is detected and it appears in multiple time frames (such as a 1st frame and a 2nd frame from FIG. 2A) in a video. The feature points for the object/feature proportionally move to the left when the device moves to the right without any flickering of the image.

FIGS. 2B and 2C illustrate false positive detection of feature points that may lead to flickering of the image in the display unit of an unstable mobile device with movement associated with it. In the false positive case, the detected feature points move out-of-sync in the various time frames although the background object (entire image) does not move in the frames, as depicted in 2nd frame of FIG. 2B and 3rd frame of FIG. 2C. At times, the feature points may also appear and disappear suddenly, as shown in the 2nd frame of FIG. 2C. Overlaying the image with shifting feature points gives the appearance of a flickering image on the display. Embodiments of the invention address this undesirable flickering of the features in the image for augmented reality on a mobile device.

As described in further detail below, by implementing aspects of the invention, a device may detect and reject this false positive detection and tracking of image objects. Embodiments of the invention use the movement of the mobile device for distinguishing false positives from shift in the image due to true movement of the mobile device, as depicted in the field of view of the camera. In one embodiment, the actual movement of the mobile device may be measured using multi-modal sensor data from inertial sensors such as accelerometers and gyroscopes. In another embodiment, the actual movement of the device is calculated using the global movement of the mobile phone with reference to other objects in the field of view of the camera. Generally, when the device doesn't move, feature points should not move and when the device moves, the feature points should move in the opposite direction on the display screen of the mobile device. Embodiments of the invention compare the movement of the mobile device with the shift of the features in the field of view in determining if the motion detected with reference to the feature in the field of view of the camera should be rejected or not.

Figure 3:
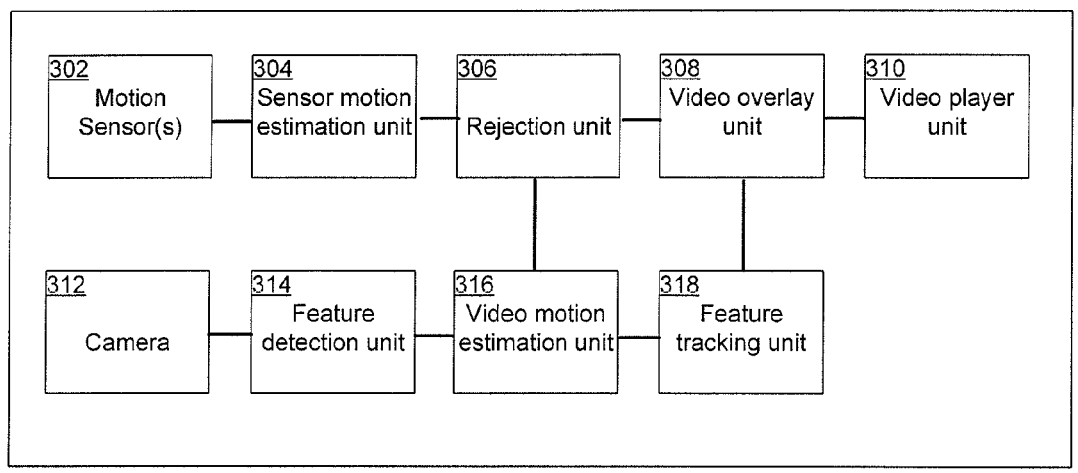
FIG. 3 is an exemplary block diagram representing exemplary components for performing methods performed by embodiments of the invention.

FIG. 3 is an exemplary block diagram representing exemplary components for performing methods performed by embodiments of the invention. Components of the invention may be implemented in hardware, software, firmware or any combination thereof. At block 302, one or more motion sensors detect movement associated with the mobile device in a 3-dimensional space. The movement of the mobile device may be due to hand tremor from the user's hand. In some embodiments, motion sensors may include inertial sensors such as accelerometers and gyroscopes. At block 304, the sensor motion estimation unit may measure the actual movement of the mobile device using multi-modal sensor data from the inertial sensors from motion sensor unit 302. The actual movement of the mobile device results in a shift of the entire image relative to the field of view of the image in the opposite direction. For instance, if a picture frame is displayed on the display unit of the mobile device from the field of view of the camera and the mobile device moves left then the picture frame in the display unit moves proportionally to the right.

At block 312, at approximately the same time, the camera unit coupled to the mobile device, captures video frames or images from the field of view of the camera. At block 314, the feature detection unit detects different features visible to the mobile device in the field of view of the camera. The feature detection unit may employ known techniques, such as SIFT or Ferns in discovering the features from the field of view of the device. At block 316, once the features are detected, the video motion estimation unit determines motion associated with the detected features. In one embodiment, the motion associated with the feature is calculated as a motion vector.

At the rejection unit 306, the global motion vector detected for the mobile device at the sensor motion estimation unit 304 is compared against the motion vector calculated for the features using image processing techniques at the video motion estimation unit 316. If the disparity between the two motion vectors is greater than a pre-determined threshold, then the motion detected from the video motion estimation unit may be discarded. However, if the disparity between the two motion vectors is lower than the pre-determined threshold, then the motion detected for the features using the video motion estimation unit 316 may be considered a valid motion vector. At block 308, the video overlay unit utilizes this motion vector to generate the overlay for the video that is visible on the display unit of the mobile device. In the previously discussed examples, the overlay unit may generate the video that is visible inside a picture frame, as seen in the display unit of the mobile device. At block 310, the video player unit, plays the generated overlay image onto the display unit of the mobile device.

The feature tracking unit 318 may also use the motion detected by the other units in aiding the tracking functionality. Tracking of the features allows regeneration of the overlay image without having to rediscover the features each time the overlay image is generated. If the feature tracking unit is successful in tracking the features, the video overlay unit 308 generates the image and the video player unit displays the overlay image on the display unit of the mobile device.

Units from FIG. 3 may be implemented in hardware, software, firmware on any combination thereof. For example, the units implemented in software may be stored in the storage device 125 of FIG. 1 and loaded into memory 135 of FIG. 1 for execution using processor 110 of FIG. 1.

Figure 4:
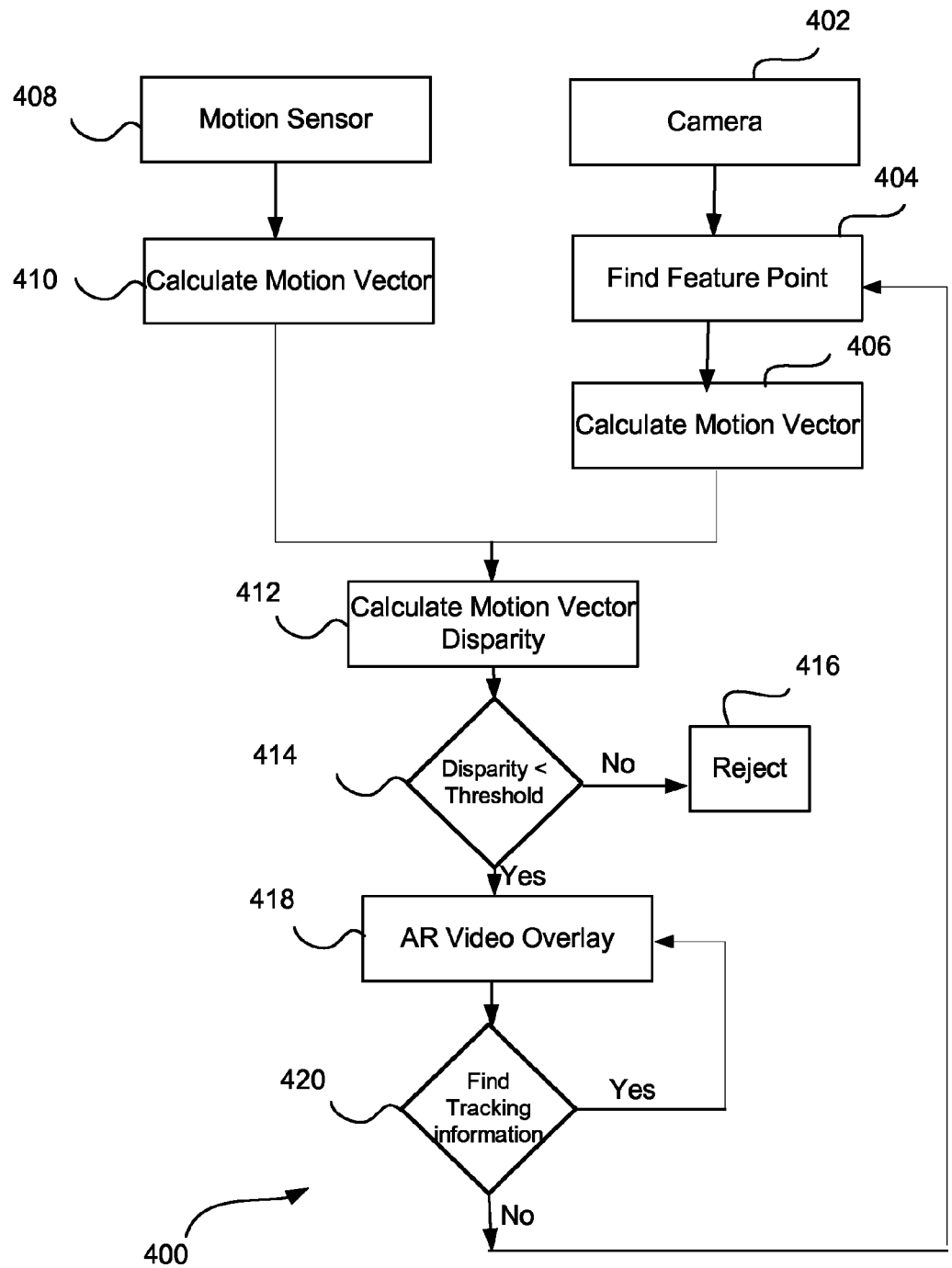
FIG. 4 is an illustration of an exemplary flow diagram, depicting a method for rejecting false positive detection and tracking of feature points for a feature.

FIG. 4 is an illustration of an exemplary flow diagram, depicting a method for rejecting false positive detection and tracking of feature points for a feature. The method 400 is performed by processing logic that comprises hardware (circuitry, dedicated logic, etc.), software (such as is run on a general purpose computing system or a dedicated machine), firmware (embedded software), or any combination thereof. In one embodiment, the method 400 is performed by device 100 of FIG. 1.

Referring to example flow from FIG. 4, at block 402, the camera coupled to the mobile device captures video frames or images from the field of view of the device. At block 404, components of the mobile device detect portions of the image that are recognized as features. Techniques such as SIFT, Ferns or any other suitable techniques may be employed in discovering the features from the field of view of the device. For example, the mobile device may recognize a picture frame in the field of view of the camera as a feature comprising a plurality of feature points. At block 406, once the features are detected, components of the mobile device determine motion associated with those features by tracking the change in position of the feature points. In one embodiment, the motion associated with a particular feature is calculated as a motion vector.

At block 410, the global motion vector for the entire image is calculated. In one embodiment, the global motion vector for the mobile device is calculated using inertial sensors such as gyroscopes and accelerometers coupled to the mobile device (block 408). The calculated global motion vector for the image is also associated with the shift for the entire image with reference to the field of view of the camera coupled to the mobile device. At block 412, components of the mobile device calculate the disparity of the motion vector for the specific feature of interest from block 404 and the global motion vector calculated at block 410. At block 414, if the disparity between the two calculated motion vectors is higher than a predetermined threshold, then the identified feature is disregarded as a false positive feature detection (block 416). However, if the disparity between the two motion vectors is below the pre-determined threshold, then the feature detected at block 404 is considered a valid feature and is used for re-generating the video overlay at block 418. At block 420, components of the mobile device determine if the detected features are still trackable after the movement of the mobile device. If the features are trackable, then the video overlay is continuously generated at block 418. If the particular feature of interest becomes untrackable, then components of the mobile device discover features again at block 404.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 5:
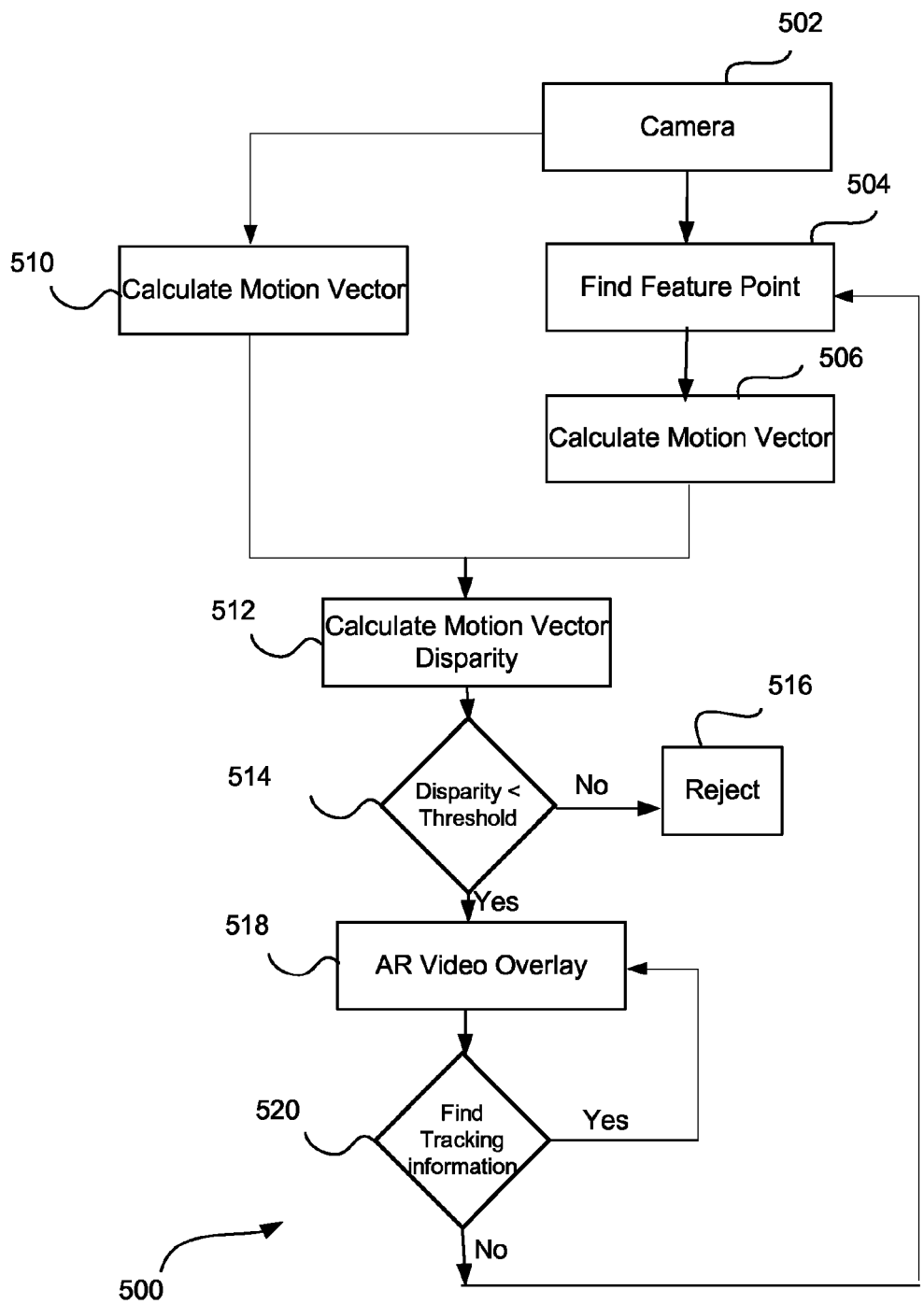
FIG. 5 is another illustration of an exemplary flow diagram, depicting a method for rejecting false positives detection and tracking of image objects.

FIG. 5 is another illustration of an exemplary flow diagram, depicting a method for rejecting false positives detection and tracking of image objects. The method 500 is performed by processing logic that comprises hardware (circuitry, dedicated logic, etc.), software (such as is run on a general purpose computing system or a dedicated machine), firmware (embedded software), or any combination thereof. In one embodiment, the method 500 is performed by device 100 of FIG. 1.

Aspects of exemplary flow FIG. 5 are similar in nature to aspects discussed with regard to FIG. 4. At block 502, the camera, coupled to a mobile device, captures video frames from the field of view of the camera. At block 504, components of the mobile device detect portions of the image that are associated with pre-determined features. At block 506, once the features are detected, components of the mobile device determine motion associated with those features. In one embodiment, the motion associated with the features is calculated as a motion vector.

At block 510, the global motion vector for the mobile device is calculated. The calculated global motion vector for the image is also associated with the shift for the entire image with reference to the field of view of the camera coupled to the mobile device. In one embodiment, the global motion vector associated with the motion for the mobile device is calculated using shifts of various features present in the field of view of the camera (block 502). In another embodiment, the global motion vector associated with the motion of the entire image is determined by deriving the motion of a plurality of points in the field of view of the camera. The plurality of points selected in the field of view for determining the global motion may be distinct from the feature in the image that may be flickering.

At block 512, components of the mobile device calculate the disparity of the motion vector for the specific feature of interest from block 504 and the global motion vector calculated at block 510. At block 514, if the disparity between the two calculated motion vectors is higher than a predetermined threshold, then the identified feature is disregarded as a false positive feature detection (block 516). However, if the disparity between the two motion vectors is below the pre-determined threshold, then the feature detected at block 504 is considered a valid feature and is used for re-generating the video overlay at block 518. At block 520, components of the mobile device determine tracking information and attempt tracking the features if the detected features are trackable. If the features are trackable, then the video overlay is continuously generated at block 518. If the particular feature of interest becomes untrackable, then components of the mobile device discover features again at block 504.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
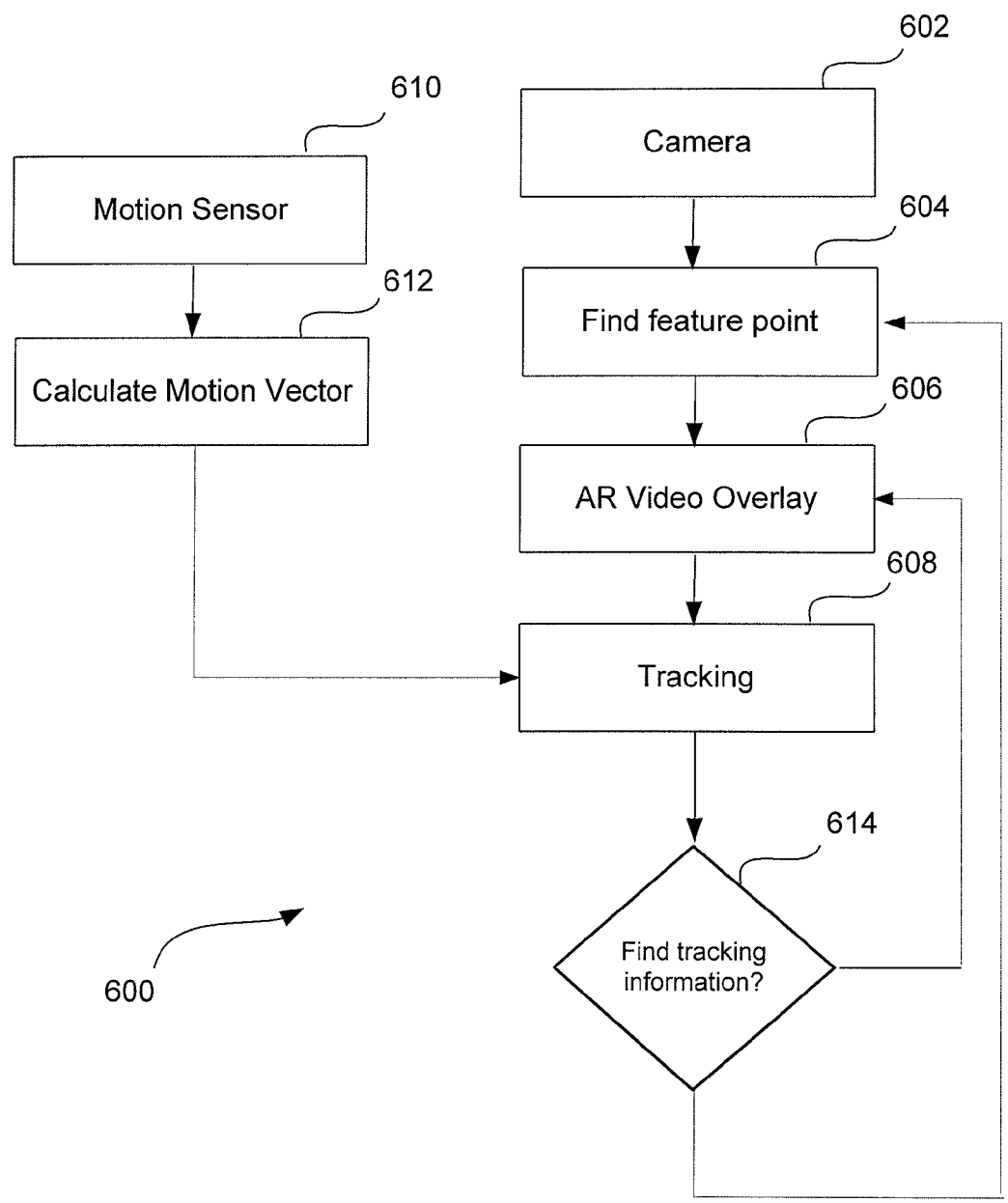
FIG. 6 is an illustration of an exemplary flow diagram, depicting a method for aiding tracking and rejecting false positives while tracking image objects.

FIG. 6 is an illustration of an exemplary flow diagram, depicting a method for aiding tracking and rejecting false positives while tracking image objects. The method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by device 100 of FIG. 1.

Tracking of the features allows regeneration of the overlay image without having to rediscover the features each time the overlay image is generated. The global motion vector for the mobile device can aid in tracking features by the device in the field of view of the camera coupled to the mobile device. In one embodiment, a global motion vector associated with the movement of the mobile device is calculated. The global motion vector associated with the mobile device also represents the motion of the entire image with respect to the field of view of the camera of the device. One or more features in the field of view of the camera are tracked for regenerating the overlay video. By using the global motion vector derived from the mobile device the search space for the movement of the features in the field of view of the camera may be dramatically reduced, advantageously increasing the speed and accuracy for tracking of the feature by the mobile device. Furthermore, the reduced search space may also aid as a filter for filtering out false positive detection and tracking for the movement of the features in the field of view of the camera.

Referring back to example flow from FIG. 6, at block 602, the camera, coupled to a mobile device, captures images or video frames from the field of view of the camera. At block 604, components of the mobile device detect portions of the image that are associated with features. In some embodiments features are pre-determined features. For example, the mobile device may recognize a picture frame in the field of view of the camera. At block 606, the augmented reality video is overlaid on portions of the image/video in the field of view of the camera coupled to the mobile device by the augmented reality components of the mobile device. At block 608, the mobile device tracks the features discovered at block 604. Tracking of the features allows regeneration of the overlay image without having to rediscover the features for generating each overlay image. In one embodiment, the tracking function performed at block 608 is enhanced by calculating a global motion vector associated with the movement of the device. At block 612, the global motion vector for the entire image is calculated. In one embodiment, the actual movement of the device may be measured using multi-modal sensor data from inertial sensors such as accelerometers and gyroscopes. (block 610).

The global motion vector also represents the shift associated with the entire image with reference to the field of view of the camera. By using the global motion vector derived by the mobile device, the search space for the movement of the feature points in the field of view of the camera may be dramatically reduced, advantageously increasing the speed and accuracy for the tracking of the features by the mobile device. For example, if the global motion vector indicates that the mobile device moved to the left by a certain distance, then the feature should move to the right in the field of view of the camera by equal distance and opposite direction (right). Furthermore, the reduced search space may also aid as a filter for filtering out false positive detection and tracking for the movement of the features in the field of view of the camera.

At block 614, if the mobile device is successful in tracking the feature points, the augmented reality video overlay is generated again at block 606. However, if the mobile device cannot track the feature point, then the feature points are rediscovered at block 604. Discovering features is usually a more time and computationally involved processes then tracking already discovered features. Therefore, it may be advantageous to track the features rather than rediscover the features.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

Figure 7:
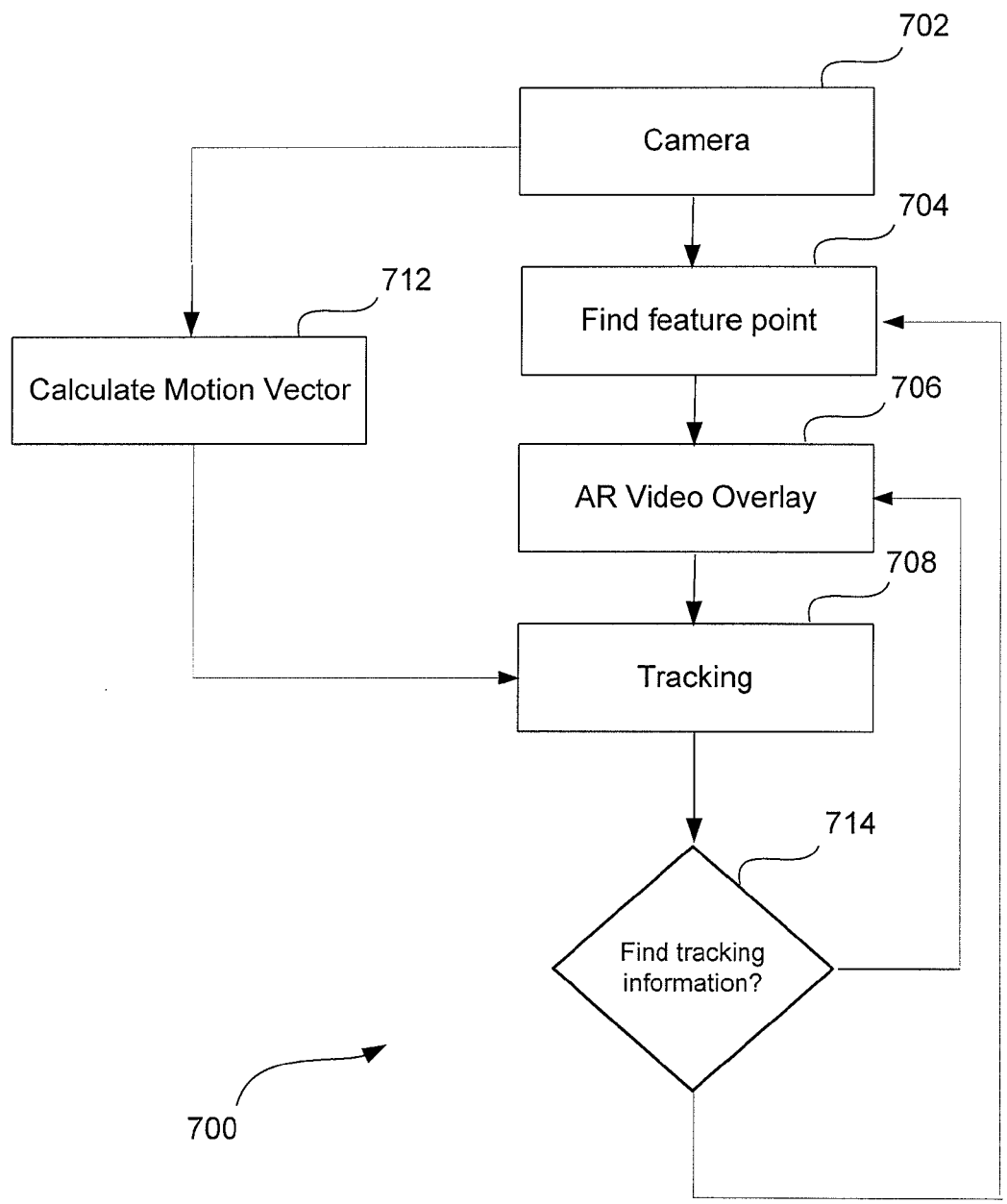
FIG. 7 is yet another illustration of an exemplary flow diagram, depicting a method for aiding tracking and rejecting false positives while tracking image objects.

FIG. 7 is yet another illustration of an exemplary flow diagram, depicting a method for aiding tracking and rejecting false positives while tracking image objects. The method 700 is performed by processing logic that comprises hardware (circuitry, dedicated logic, etc.), software (such as is run on a general purpose computing system or a dedicated machine), firmware (embedded software), or any combination thereof. In one embodiment, the method 700 is performed by device 100 of FIG. 1.

Tracking of the features allows regeneration of the overlay image without having to rediscover the features each time the overlay image is generated. The global motion vector for the mobile device can aid in tracking features by the device in the field of view of the camera coupled to the mobile device. In FIG. 6, the global motion vector is calculated using inertial sensors. However, the global motion vector may also be determined by analyzing the image/video obtained using the camera as described further in reference to FIG. 7.

Referring to example flow from FIG. 7, at block 702, the camera, coupled to a mobile device, captures images or video frames from the field of view of the camera. At block 704, components of the mobile device detect portions of the image that are associated with features. In some embodiments features are pre-determined features. For example, the mobile device may recognize a picture frame in the field of view of the camera. The augmented reality components of the device may overlay the interior of the picture frame with an image or a video. At block 706, the augmented reality video is overlaid on portions of the image/video in the field of view of the camera coupled to the mobile device. At block 708, the mobile device tracks the features discovered at block 704. Tracking of the features allows regeneration of the overlay image without having to rediscover the features for generating each overlay image.

In one embodiment, the tracking function performed at block 708 is enhanced by calculating a global motion vector associated with the movement of the device. The global motion vector associated with the motion of the entire image is calculated using motion of various features present in the field of view of the camera (block 702). In another embodiment, the global motion vector associated with the motion of the entire image is determined by deriving the motion of a plurality of points in the field of view of the camera. The plurality of points selected in the field of view for determining the global motion may be distinct from the feature in the image that may be flickering.

At block 714, if the mobile device is successful in tracking the feature points, the Augmented Reality video overlay is generated again at block 706. However, if the mobile device cannot track the feature point, then the feature points are rediscovered at block 704. Discovering features is usually a more time and computationally involved processes then tracking already discovered features. Therefore, it may be advantageous to track the features rather than rediscover the features.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
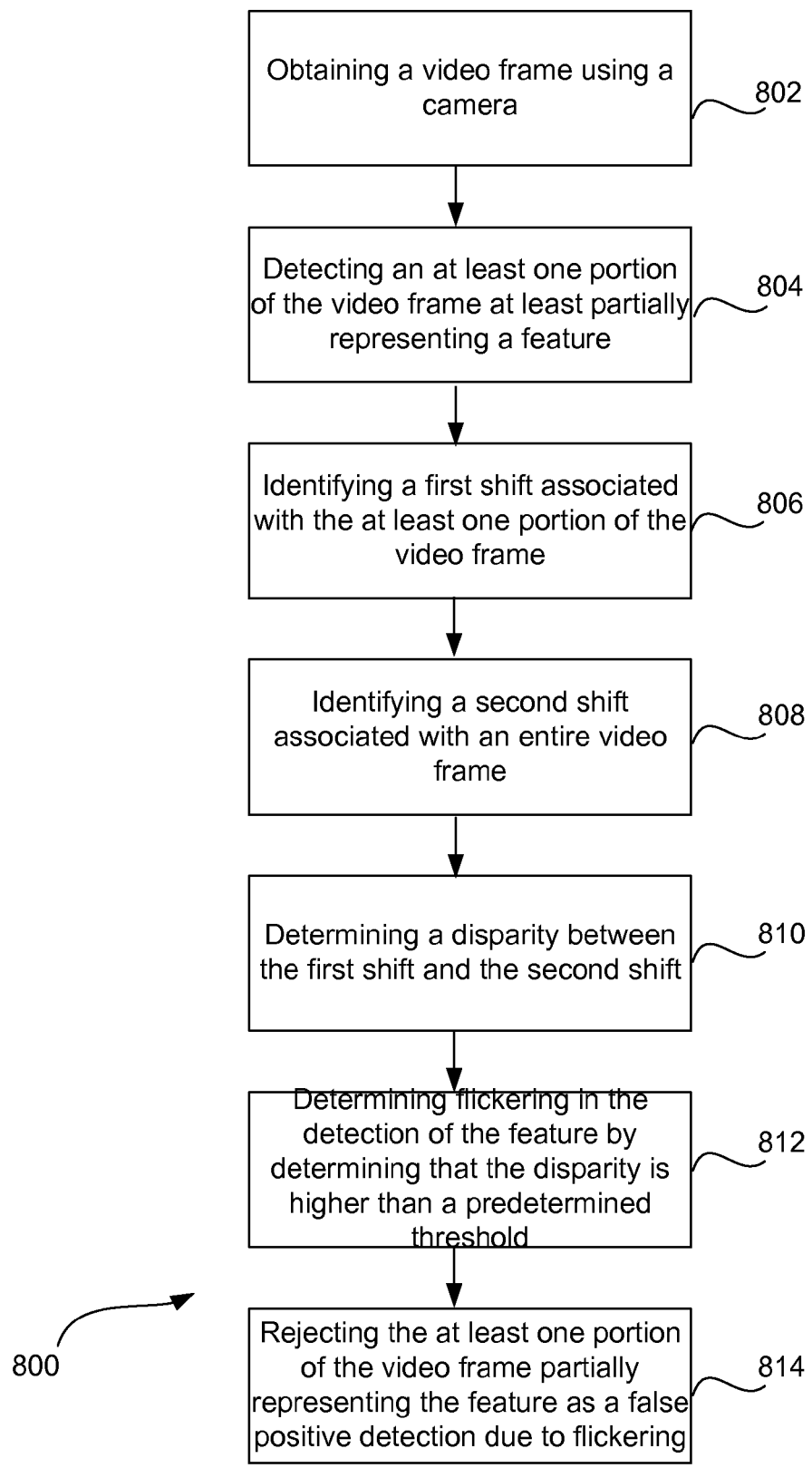
FIG. 8 is a flow diagram illustrating an exemplary method for tracking features using a mobile device.

FIG. 8 is a flow diagram illustrating an exemplary method for tracking features using a mobile device. The method 800 is performed by processing logic that comprises hardware (circuitry, dedicated logic, etc.), software (such as is run on a general purpose computing system or a dedicated machine), firmware (embedded software), or any combination thereof. In one embodiment, the method 800 is performed by device 100 of FIG. 1.

Referring to example flow from FIG. 8, at block 802, a camera coupled to the mobile device obtains a video frame. At block 804, components of the mobile device detect an at least one portion of the video frame at least partially representing a feature. At block 806, components of the mobile device identify a first shift associated with the at least one portion of the video frame. At block 808, components of the mobile device identify a second shift associated with an entire video frame. In one embodiment, the second shift associated with the entire video frame is identified using motion detection using an inertial sensor coupled to the mobile device. Examples of inertial sensors include, but are not limited to, gyroscopes and accelerometers. In other embodiments, the second shift associated with the entire video frame is identified using motion calculated from portions of the video frame that are distinct from the at least one portion of the video frame representing the feature.

At block 810, determine a disparity between the first shift and the second shift. At block 812, determine flickering in the detection of the feature by determining that the disparity is higher than a predetermined threshold. At block 814, reject the at least one portion of the video frame at least partially representing the feature as a false positive detection due to flickering. If the disparity is lower than the predetermined threshold, then components of the mobile device overlay the video according to the first shift for displaying on a display unit.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 9:
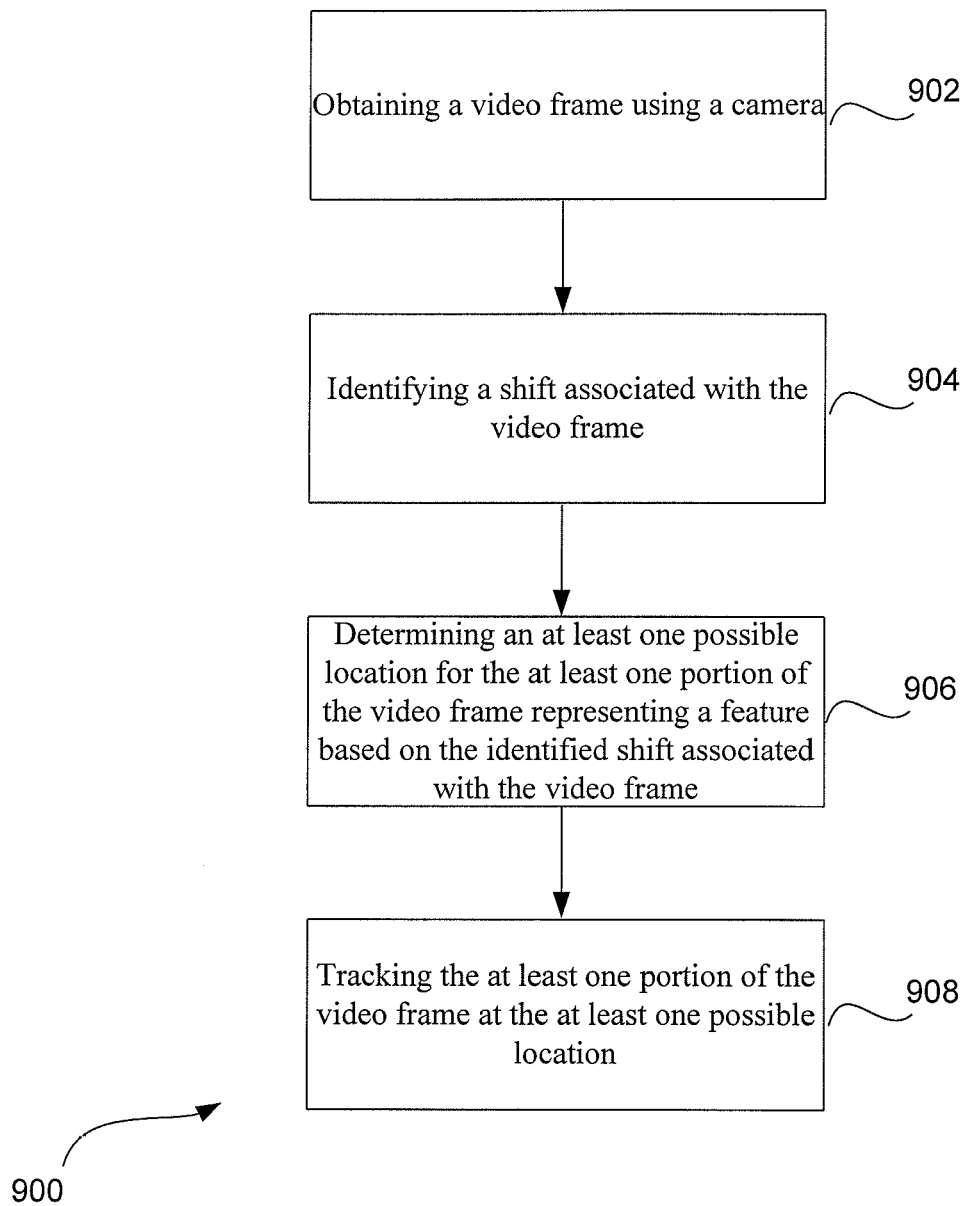
FIG. 9 is a flow diagram illustrating an exemplary method for tracking at least one portion of a video.

FIG. 9 is a flow diagram illustrating an exemplary method for tracking at least one portion of a video. The method 900 is performed by processing logic that comprises hardware (circuitry, dedicated logic, etc.), software (such as is run on a general purpose computing system or a dedicated machine), firmware (embedded software), or any combination thereof. In one embodiment, the method 900 is performed by device 100 of FIG. 1.

Referring to the example flow from FIG. 9, at block 902, a camera coupled to a mobile device obtains a video frame using a camera coupled to the mobile device. At block 904, the device identifies a shift associated with the video frame. In one embodiment, the shift associated with the video frame is identified using motion detected using an inertial sensor coupled to the mobile device. Examples of inertial sensors include, but are not limited to, gyroscopes and accelerometers. In other embodiments, the shift associated with the video frame is identified using motion calculated from portions of the video frame that are distinct from the at least one portion of the video frame representing the feature.

At block 906, determine an at least one possible location for the at least one portion of the video frame representing a feature based on the identified shift associated with the video frame. At block 908, track the at least one portion of the video frame at the at least one possible location. The mobile device continuously overlays the video according to the detected shift as long as the features are positively tracked. On the other hand, components of the mobile device reject the at least one portion of the video frame partially representing the feature as a false positive detection of the feature if the at least one portion of the video frame is detected outside the at least one possible location for the at least one portion of the video frame.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

What is claimed is:

1. A method for rejecting information using a mobile device, the method comprising:
   obtaining a video frame using a camera coupled to the mobile device;
   detecting an at least one portion of the video frame at least partially representing a feature;
   identifying a first shift associated with the at least one portion of the video frame;
   identifying a second shift associated with an entire video frame, wherein the second shift associated with the entire video frame is identified using motion calculated from portions of the video frame that are distinct from the at least one portion of the video frame;
   determining a disparity between the first shift and the second shift;
   determining flickering in a detection of the feature by determining that the disparity is higher than a predetermined threshold; and
   rejecting the at least one portion of the video frame at least partially representing the feature as a false positive detection due to flickering.

2. The method of claim 1, further comprising overlaying a video according to the first shift for displaying on a display unit if the disparity is lower than the predetermined threshold.

3. The method of claim 1, wherein identifying the second shift associated with the entire video frame further comprises using motion detected from an inertial sensor coupled to the mobile device.

4. The method of claim 3, wherein the inertial sensor is at least one from a group comprising of a gyroscope and an accelerometer.

5. A method for tracking at least one portion of a video, the method comprising:
   obtaining a video frame using a camera coupled to a mobile device;
   identifying a shift associated with the video frame, wherein the shift associated with the video frame is identified using motion calculated from portions of the video frame that are distinct from the at least one portion of the video frame;
   determining an at least one possible location for the at least one portion of the video frame representing a feature based on the shift associated with the video frame; and
   tracking the at least one portion of the video frame at the at least one possible location.

6. The method of claim 5, further comprising rejecting the at least one portion of the video frame partially representing the feature as a false positive detection of the feature if the at least one portion of the video frame is detected outside the at least one possible location for the at least one portion of the video frame.

7. The method of claim 5, further comprising overlaying the video according to the shift.

8. The method of claim 5, wherein identifying the shift associated with the video frame further comprises using motion detected from an inertial sensor coupled to the mobile device.

9. The method of claim 8, wherein the inertial sensor is at least one from a group comprising of a gyroscope and an accelerometer.

10. A device, comprising:
    a processor;
    a camera coupled to the processor;
    a display unit coupled to the processor; and
    a non-transitory computer readable storage medium coupled to the processor, wherein the non-transitory computer readable storage medium comprises code executable by the processor comprising:
       obtaining a video frame using the camera coupled to the device;
       detecting an at least one portion of the video frame at least partially representing a feature;
       identifying a first shift associated with the at least one portion of the video frame;
       identifying a second shift associated with an entire video frame, wherein the second shift associated with the entire video frame is identified using motion calculated from portions of the video frame that are distinct from the at least one portion of the video frame;
       determining a disparity between the first shift and the second shift;
       determining flickering in a detection of the feature by determining that the disparity is higher than a predetermined threshold; and
       rejecting the at least one portion of the video frame at least partially representing the feature as a false positive detection due to flickering.

11. The device of claim 10, further comprising overlaying a video according to the first shift for displaying on the display unit if the disparity is lower than the predetermined threshold.

12. The device of claim 10, wherein identifying the second shift associated with the entire video frame further comprises using an inertial sensor coupled to the device.

13. The device of claim 12, wherein the inertial sensor is at least one from a group comprising of a gyroscope and an accelerometer.

14. A device, comprising:
    a processor;
    a camera coupled to the processor;
    a display unit coupled to the processor; and
    a non-transitory computer readable storage medium coupled to the processor, wherein the non-transitory computer readable storage medium comprises code executable by the processor comprising:
       obtaining a video frame using the camera coupled to the device for tracking an at least one portion of the video frame;
       identifying a shift associated with the video frame, wherein the shift associated with the video frame is identified using motion calculated from portions of the video frame that are distinct from the at least one portion of the video frame;

determining an at least one possible location for the at least one portion of the video frame representing a feature based on the shift associated with the video frame; and tracking the at least one portion of the video frame at the at least one possible location.

15. The code of claim 14, further comprising rejecting the at least one portion of the video frame partially representing the feature as a false positive detection of the feature if the at least one portion of the video frame is detected outside the at least one possible location for the at least one portion of the video frame.

16. The code of claim 14, further comprising overlaying a video according to the shift.

17. The code of claim 14, wherein identifying the shift associated with the video frame further comprises using motion detected from an inertial sensor coupled to the device.

18. The code of claim 17, wherein the inertial sensor is at least one from a group comprising of a gyroscope and an accelerometer.

19. A non-transitory computer readable storage medium coupled to a processor, wherein the non-transitory computer readable storage medium comprises a computer program executable by the processor comprising:
   obtaining a video frame using a camera coupled to a mobile device;
   detecting an at least one portion of the video frame at least partially representing a feature;
   identifying a first shift associated with the at least one portion of the video frame;
   identifying a second shift associated with an entire video frame, wherein the second shift associated with the entire video frame is identified using motion calculated from portions of the video frame that are distinct from the at least one portion of the video frame;
   determining a disparity between the first shift and the second shift;
   determining flickering in a detection of the feature by determining that the disparity is higher than a predetermined threshold; and
   rejecting the at least one portion of the video frame at least partially representing the feature as a false positive detection due to flickering.

20. A non-transitory computer readable storage medium coupled to a processor, wherein the non-transitory computer readable storage medium comprises a computer program executable by the processor comprising:
   obtaining a video frame using a camera coupled to a mobile device, for tracking an at least one portion of the video frame;
   identifying a shift associated with the video frame, wherein the shift associated with the video frame is identified using motion calculated from portions of the video frame that are distinct from the at least one portion of the video frame;
   determining an at least one possible location for the at least one portion of the video frame representing a feature based on the shift associated with the video frame; and
   tracking the at least one portion of the video frame at the at least one possible location.

21. An apparatus for rejecting information comprising:
   means for obtaining a video frame using a camera coupled to a mobile device;
   means for detecting an at least one portion of the video frame at least partially representing a feature;
   means for identifying a first shift associated with the at least one portion of the video frame;
   means for identifying a second shift associated with an entire video frame, wherein the second shift associated with the entire video frame is identified using motion calculated from portions of the video frame that are distinct from the at least one portion of the video frame;
   means for determining a disparity between the first shift and the second shift;
   means for determining flickering in a detection of the feature by determining that the disparity is higher than a predetermined threshold; and
   means for rejecting the at least one portion of the video frame at least partially representing the feature as a false positive detection due to flickering.

22. An apparatus for tracking comprising:
   means for obtaining a video frame using a camera coupled to a mobile device for tracking an at least one portion of the video;
   means for identifying a shift associated with the video frame, wherein the shift associated with the video frame is identified using motion calculated from portions of the video frame that are distinct from the at least one portion of the video frame;
   means for determining an at least one possible location for the at least one portion of the video frame representing a feature based on the shift associated with the video frame; and
   means for tracking the at least one portion of the video frame at the at least one possible location.

* * * * *